UNITED STATES PATENT OFFICE.

HYMAN LEWIS, OF FITZROY, NEAR MELBOURNE, VICTORIA, AUSTRALIA.

COMPOSITION FOR MAKING ARTIFICIAL LEATHER.

No. 894,334.     Specification of Letters Patent.     Patented July 28, 1908.

Application filed November 8, 1907. Serial No. 401,317.

*To all whom it may concern:*

Be it known that I, HYMAN LEWIS, a subject of the King of Great Britain, residing at No. 2 King William street, Fitzroy, near Melbourne, in the State of Victoria, Australia, have invented certain new and useful Improvements in a Composition for Making Artificial Leather; and I do declare the following to be a full, clear, and exact description of the invention, such as will enable others skilled in the art to which it appertains to make and use the same.

This invention has been devised to provide a new article of manufacture or material which may be employed in various ways for trade purposes such for instance as in lieu of, or substitute for, leather and the like leathern substances, or by different adjustments of its component parts, as a substitute for floor coverings, embossed articles and the like wares.

The main feature of the invention is that it absorbs and renders valuable, waste or scrap leather left over from the manufacture of leather goods of all classes and description. As is well known the bulk of the waste or scrap leather is of little or no value at present and therefore practically unprofitable as a market commodity.

The new material forming the subject matter of this invention may be manufactured into various forms of wares such for instance as machinery belting, motor tires, floor coverings and articles in which resiliency and hard wearing surface are essentials. By the process and method hereinafter set out this can be carried into practical effect.

I shall now describe one form of manufacture to carry my invention into effect although it is to be distinctly understood that the proportions given below may be varied to suit the differing requirements of manufacture or circumstances, or the altering qualities and strengths of the materials forming the separate portions of the composition.

I take a certain proportion of waste or scrap leather and crush or grind the same, by any suitable disintegrating means, into a powder as fine as flour or as fine as may be more suitable for any particular article required. The proportion which I shall set forth for this illustration is with say 9 lbs. by weight of such ground up scrap leather. After this has been ground or crushed to the degree required I add the following ingredients in the proportions set out, viz:—

| | |
|---|---|
| Rubber | 4 lbs. |
| Petrolatum | 4 ozs. |
| Zinc oxid | 12 ozs. |
| Pitch | 4 ozs. |
| Sulfur, precipitated sulfur or plumbic oxid | 12 ozs. |
| Yellow ocher | 2 ozs. |
| Cotton or other suitable fiber | 2 lbs. |
| Antimony | 9 ozs. |
| Vermilion | 2 ozs. |

In lieu of the vermilion I may if desired, use any other suitable medium to give the composition the required color, for any particular purpose.

The rubber gives elasticity to my new material when in its completed state, while also acting as a binding or cementing agent. The petrolatum gives the material the necessary moisture to render the composition plastic and easy to mold during its manufacture. The zinc oxid and pitch act as a hardening or consolidating medium and the yellow ocher and vermilion act as a coloring medium— while the fiber acts also as a binding or uniting medium. The antimony acts as a preservative to prevent the finished material from cracking or perishing.

The method or process of manufacturing my new material is as follows:—The above ingredients are crushed and ground and then well intermixed until the mass reaches a plastic condition and then rolled to any thickness required.

To prevent "side creeping" or undue stretching of the material when in use, I may insert, during the rolling process, between two layers thereof, a sheet of metal or cotton gauze, in the latter case the cotton being preferably previously dipped in asbestos or other suitable non-conducting heat medium. Where my new material is to be used as an insertion in connection with high pressure steam appliances I may permeate the disintegrated leather with a mixture of asbestos either alone or in combination with other non-combustible or non-conducting heat media. The resultant mass may then be released from the rollers when it is ready to be molded into any desired shape for any particular article required; after which it is then "cured" by being submitted to the action of any suitable steam pressure for the vulcanizing of the same, the sulfur or plumbic oxid acting as the desired vulcanizing agent. Or for very thin material the resultant mass, in lieu of being submitted to the steam chamber for vulcanizing, may be submerged in a bisulfid of carbon and chlorid of sulfur bath or otherwise saturated with such chemicals, which act practically as vulcanizing agents. It is then exposed and allowed to dry after which the material or articles made therefrom are ready for the market.

The description hereinbefore given and the composition and proportion of materials may be deemed suitable for the material when same is to be used for such purposes for instance as sole leather, floor covering, motor tire treads, bag work, belting etc., but when my invention is to be applied to the production of a substitute for a higher quality of leather I will decrease the quantity of disintegrated leather proportionately in the inverse ratio of the strength of the material required, and I also increase the cotton or fibrous media proportionately in such alteration. I would have it understood that where the word rubber is employed in this specification I include india rubber—para rubber, suitable forms of gutta percha, caoutchouc or other suitable gums having the necessary peculiar properties for the purpose intended.

My material prior to its being vulcanized may be molded into such shapes and forms as may be required for ornaments, handles, toys and the like molded wares.

I claim:—

1. A composition of matter consisting of disintegrated leather about 9 lbs., rubber 4 lbs., petrolatum 4 ozs., zinc oxid 12 ozs., pitch 4 ozs., sulfur, precipitated sulfur or plumbic oxid 12 ozs., yellow ocher 2 ozs., fiber 2 lbs., antimony 9 ozs., vermilion 2 ozs., substantially as and for the purposes set forth.

2. A composition of matter consisting of disintegrated leather about 9 lbs., rubber about 4 lbs., petrolatum about 4 ozs., zinc oxid about 12 ozs., pitch about 4 ozs., sulfur, precipitated sulfur or plumbic oxid about 12 ozs., yellow ocher about 2 ozs., fiber about 2 lbs., antimony about 9 ozs., and vermilion about 2 ozs., compounded together and dipped, sprayed or otherwise permeated with bisulfid of carbon and chlorid of sulfur substantially as and for the purposes set forth.

In testimony whereof I have signed my name to this specification in the presence of two subscribing witnesses.

HYMAN LEWIS.

Witnesses:
ALICE HARKER,
AUGUSTINE THOMAS MADDEN.